G. KRAMER.
LICENSE PLATE HOLDER AND ILLUMINATOR THEREFOR.
APPLICATION FILED DEC. 12, 1921.
1,411,920. Patented Apr. 4, 1922.
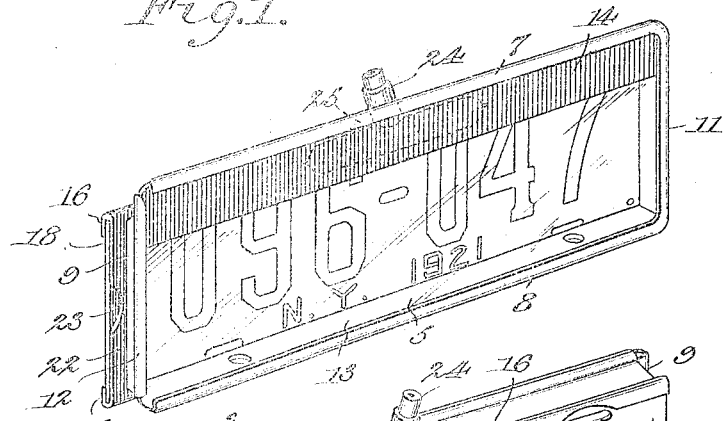
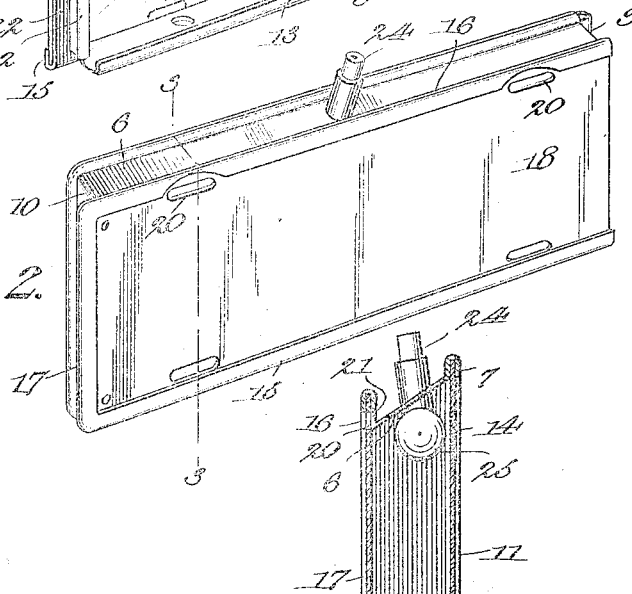
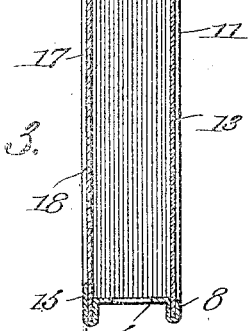
George Kramer.
INVENTOR
BY Victor J. Evans
ATTORNEY
WITNESS

UNITED STATES PATENT OFFICE.

GEORGE KRAMER, OF BROOKLYN, NEW YORK.

LICENSE-PLATE HOLDER AND ILLUMINATOR THEREFOR.

1,411,920.  Specification of Letters Patent.  Patented Apr. 4, 1922.

Application filed December 12, 1921. Serial No. 521,705.

*To all whom it may concern:*

Be it known that I, GEORGE KRAMER, a citizen of the United States, residing at Brooklyn, in the county of Kings and State of New York, have invented new and useful Improvements in License-Plate Holders and Illuminators Therefor, of which the following is a specification.

This invention relates to license plate illuminating devices and has for its primary object the provision of a casing structure formed and designed whereby to adapt itself to a regulation license plate of the kind having bracket apertures therein for reception of the customary license supporting brackets, and the provision of a casing wherein apertures are formed and adapted to coincide with the apertures of the license plate so as to operatively accommodate the aforesaid brackets.

Another object of the invention is to provide a license plate illuminating device which will consist of a casing structure open respectively at its front and rear sides and respectively adapted to accommodate the license plate and a transparent panel and illuminating means being provided in the casing so that light will be uniformly cast upon the license indicia of the license plate.

A further object of the invention is to provide a license plate illuminator which will consist of means for supporting the license plate and a transparent panel, the latter having an opaque portion behind which an electric lamp is arranged and adapted to uniformly illuminate the license indicia of said plate.

A further object of the invention is to provide a novel form of license plate illuminator which will be simple, strong and durable and which will embody a transparent panel formed of relatively flexible material such as isinglass, celluloid, or the like.

With the above and other objects in view which will appear as the nature of the invention is better understood, the same consists in the improved construction and novel arrangements of parts which will hereinafter be fully described and particularly pointed out in the claims.

In the accompanying drawings has been illustrated, a single and preferred form of the invention, it being, however, understood that no limitations are necessarily made to the precise structural details therein exhibited, but that changes, alterations and modifications within the scope of the claims may be resorted to when desired.

Figure 1, is a front perspective view of the device.

Figure 2 is a rear perspective view thereof.

Figure 3 is a vertical section taken substantially on the line 3—3 of Figure 2.

In carrying the invention into practice, use is made of a casing which is preferably formed of metal and provided with a substantially horizontal base wall 5 and a top wall 6, the latter extending rearwardly and upwardly and provided at its free rear edge with a guide flange 7. The wall 5 is provided with a similar guide flange 8. These walls 5 and 6 are connected by end walls 9 and 10, the latter provided with a stop flange 11 and the former with a bendable locking flange 12. Mounted to slide in the guide flanges 7 and 8 is a transparent panel 13 which is formed preferably of isinglass, celluloid or some other suitable well known transparent flexible material. This panel is provided with an opaque curtain 14, which extends over the full length of the panel at the top thereof at a point in immediate proximity to the wall 6, of the casing. This curtain is preferably formed by coating the panel with a suitable opaque or non-transparent paint. However, I do not wish to limit myself in this connection as other means might be substituted therefor without departing from the spirit of the annexed claims.

The walls 5 and 6, are upstruck at the rear open side of the casing so as to provide guide flanges 15 and 16 and the end wall 10 is correspondingly upstruck to provide a stop flange 17. These flanges respectively accommodate the customary license plate 18, the same having slots 20—20 formed therein which coincide with corresponding slots 21 formed in the wall 6. Incident to this arrangement it obviously follows that these slots 20 and 21 are capable of adapting themselves to the customary supporting brackets as provided for the usual support of the license plate. The wall 9 of the casing is provided with a flange 22, having a cut out portion or finger space 23 from which one end of the license plate is exposed whereby it can be manipulated by the fingers and adjusted into the guides 15 and 16 or removed therefrom as the occasion demands.

The top wall 6 of the casing is provided with a socket 24 adapted to be arranged in a suitable battery circuit (not shown). This socket opens into the casing and is arranged at the medial portion of the wall 6 and the same is adapted to accommodate an elongated longitudinally disposed electric bulb 25 as shown in dotted lines in Figure 1. In this manner the bulb is disposed entirely behind the opaque curtain 14 and it is adapted to cast a ray of light against the inside angular surface of the wall 6 and correspondingly against the inside surface of the walls 5, 9 and 10. All of these walls are preferably mirrored and owing to the general arrangement of instrumentalities and the manner of mounting the electric bulb, behind the curtain 14, a uniform light is cast over the indicia bearing surface of the license plate and the same is illuminated in a manner which will enable one to see it for a considerable distance at night. In order to relieve the casing of water of condensation, the base wall 5 of the casing is provided with suitable apertures.

What I claim as new is:—

1. A device comprising a casing open at two sides, a transparent panel covering one side of the casing, the other open side of the casing adapted to be closed by an indicia bearing plate, the indicia on said plate facing said transparent panel, the panel having an opaque curtain extending the full length of the casing near the top thereof, and a lamp interposed between the open sides of the casing and supported by one wall of the latter and concealed by said curtain.

2. A license plate holder, an illuminator therefor comprising a casing open at two sides, a flexible transparent panel removably fitted over one side of the casing, the other side of said casing adapted to receive the license plate so that its indicia faces the transparent panel, the said casing embodying mirrored walls, an opaque curtain formed on the panel and a lamp supported by one of said walls and arranged at the rear of said curtain.

3. A device comprising a casing open at two sides, one of said sides having means for the detachable accommodation of an indicia bearing plate one wall of the casing having slots therein to coincide with the bracket receiving slots in said plate, a transparent panel extending over the other open side of the casing, and provided with an opaque curtain, the indicia on said plate facing said transparent panel, and a lamp supported in the casing behind said curtain.

4. A device comprising a casing open at two sides and provided with walls including an angularly disposed wall adapted to frame an indicia bearing plate, said walls having mirrored surfaces, one of said open sides having means for accommodating said plate, a flexible transparent panel closing the other side of the casing, a coating of opaque paint arranged in the length of the transparent panel near the top thereof, the indicia on said plate facing said transparent panel, and a lamp carried by the casing and concealed by said curtain, the curtain and the mirrored surfaces all combining to cause a uniform light ray to be projected over the indicia of said plate when the lamp is lighted.

In testimony whereof I have affixed my signature.

GEORGE KRAMER.